US009189227B2

(12) United States Patent
Johansson et al.

(10) Patent No.: US 9,189,227 B2
(45) Date of Patent: Nov. 17, 2015

(54) SYSTEMS, METHODS, AND COMPUTER PROGRAM PRODUCTS FOR A SOFTWARE BUILD AND LOAD PROCESS USING A COMPILATION AND DEPLOYMENT SERVICE

(71) Applicant: TELEFONAKTIEBOLAGET L M ERICSSON (PUBL), Stockholm (SE)

(72) Inventors: Bengt Johansson, Vastra Frolunda (SE); Per Andersson, Montreal (CA); Abdallah Chatila, Montreal (CA); Anders Franzen, Trangsund (SE); Tarik Hammam, Kista (SE); Jon Maloy, Montreal (CA); Tord Nilsson, Bohus-Bjorko (SE); Sten Rune Pettersson, Torslanda (SE); Richard Tremblay, Rosemere (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/105,694

(22) Filed: Dec. 13, 2013

(65) Prior Publication Data

US 2014/0181800 A1   Jun. 26, 2014

Related U.S. Application Data

(60) Provisional application No. 61/737,605, filed on Dec. 14, 2012.

(51) Int. Cl.
G06F 9/44 (2006.01)
G06F 9/445 (2006.01)

(52) U.S. Cl.
CPC .. *G06F 8/70* (2013.01); *G06F 8/67* (2013.01); *G06F 8/68* (2013.01)

(58) Field of Classification Search
USPC .................................... 717/168–175; 709/203
IPC .......................................... G06F 8/20,8/60, 8/70
See application file for complete search history.

(56) References Cited

U.S. PATENT DOCUMENTS

| | | | | |
|---|---|---|---|---|
| 6,385,766 | B1 * | 5/2002 | Doran et al. .................. | 717/174 |
| 6,397,385 | B1 * | 5/2002 | Kravitz ......................... | 717/173 |
| 6,438,743 | B1 * | 8/2002 | Boehm et al. ................ | 717/122 |
| 6,598,223 | B1 * | 7/2003 | Vrhel et al. ................... | 717/174 |
| 7,055,149 | B2 * | 5/2006 | Birkholz et al. .............. | 717/172 |

(Continued)

OTHER PUBLICATIONS

Shridhar et al, "A Qualitative Analysis of Software Build System Changes and Build Ownership Styles", ACM, pp. 1-10, 2014.*

(Continued)

*Primary Examiner* — Anil Khatri
(74) *Attorney, Agent, or Firm* — Rothwell, Figg, Ernst & Manbeck, P.C.

(57) ABSTRACT

Systems, methods, and computer program products for a software build and load process using a compilation and deployment service. A method for a software build and load process using a compilation and deployment service includes receiving, at the service, new software. The method further includes comparing, at the service, the received new software with data in a database, wherein the data comprises active software. The method further includes merging, at the service said new software and active software into one or more load modules based on the comparison. The method further includes deploying the one or more load modules to one or more target processing units.

21 Claims, 7 Drawing Sheets

(56) References Cited

U.S. PATENT DOCUMENTS

| | | | |
|---|---|---|---|
| 7,774,772 B2 * | 8/2010 | Tal et al. | 717/172 |
| 7,793,280 B2 * | 9/2010 | De Boer et al. | 717/169 |
| 7,937,685 B2 * | 5/2011 | Weil et al. | 717/103 |
| 8,185,576 B2 * | 5/2012 | Rose | 709/203 |
| 8,327,351 B2 * | 12/2012 | Paladino et al. | 717/177 |
| 8,438,541 B2 * | 5/2013 | Abrams et al. | 717/120 |
| 8,533,704 B2 * | 9/2013 | Wookey | 717/174 |
| 8,584,113 B2 * | 11/2013 | McCurdy et al. | 717/170 |
| 8,701,102 B2 * | 4/2014 | Appiah et al. | 717/171 |

OTHER PUBLICATIONS

Burg et al, "Tracing Software Build Processes to Uncover License Compliance Inconsistencies", ACM, pp. 731-741, 2014.*

Elsner et al, "An Infrastructure for Composing Build Systems of Software Product Lines", ACM, pp. 1-8, 2011.*

Unphon, "Making Use of Architecture throughout the Software Life Cycle—How the Build Hierarchy can Facilitate Product Line Development", IEEE, pp. 41-48, 2009.*

International Search Report and the Written Opinion of the International Searching Authority dated Feb. 13, 2014, in International Application No. PCT/EP2013/076506, 10 pages.

Duvall, "This DZone Refcard is brought to you by: Visit rfcardz.com to browse and download the entire DZone Refcardz collection Continuous Integration: Patterns and Anti-patterns" 2010, 7 pages.

Melling et al. "Comparing Android Applications to find Copying", The Journal of Digital Forensics, Security and Law, vol. 7, No. 1, 2012, 108 pages.

Mens, "A State-of-the-Art Survey on Software Merging" IEEE Transactions on Software Engineering, vol. 28, No. 5, 2002, pp. 449-462.

* cited by examiner

SYSTEMS, METHODS, AND COMPUTER PROGRAM PRODUCTS FOR A SOFTWARE BUILD AND LOAD PROCESS USING A COMPILATION AND DEPLOYMENT SERVICE

CROSS-REFERENCE TO RELATED APPLICATION(S)

The present application claims the benefit of U.S. Provisional Application Ser. No. 61/737,605, filed Dec. 14, 2012, and of PCT Application Serial No. PCT/EP2013/076506, filed Dec. 13, 2013. The entire contents of each of the referenced applications are incorporated by reference herein.

TECHNICAL FIELD

The present invention relates generally to improving software build and load processes, and more particularly, to systems, methods, and computer program products for a software build and load process using a compilation and deployment service.

BACKGROUND

Typically, after a software application is built, the source code, configuration files, and other artefacts are generated, compiled, and packed into load modules. Once these load modules are built, the load modules may be shipped to an execution environment where they are loaded and possibly linked to a processing unit.

FIG. 1 is a flow chart illustrating a typical build process. Source files 110 may be provided or automatically created using a generator 120. A generator 120 may use configuration files 100 to automatically generate source files 110 using, for example, generic frames, classes, prototypes, templates, aspects, or other ontological models. Generator 120 may also include one or more programming tools, such as a template processor or an integrated development environment ("IDE").

The source files 110 may be compiled by a compiler 130 into object files 140. The compiler 130 may be a computer program, or a set of programs, that transforms source code written in one programming language into another computer language. For example, the compiler 130 may translate source code from a high-level programming language to a lower level language, such as assembly language or machine code.

In a typical build process, as illustrated in FIG. 1, a compiler 130 may translate source files 110 into object files 140. Object files 140 may contain, for example, relocate-able format machine code. Since object files 140 may not be directly executable, they may be inputted into an archiver 150. The archiver 150 may be a linker, or link editor, that takes one or more object files generated by a compiler 130 and combines them into a single executable program, or load module 160. A computer application may comprise several modules 160, and all of the modules are not necessarily contained in a single object file 140. For example, the object files 140 may contain symbols that are resolved by an archiver 150, which links the object files into a unified executable program, or load modules 160. As a result, the load modules 160 may comprise an Executable and Linkable Format ("ELF") archive, a JAR (Java™ ARchive) or TAR (Tape ARchive) file, a Debian ("DEB") or RPM package, or other containers.

Once the load modules are built for a software application, the type of the software application may determine how the load modules are sent from the building site to be loaded onto a processing unit. Currently, when sending the load-units to the processing unit, it is often assumed that the new load-units do not interfere with the existing software on the processing unit. Additionally, it is often assumed that the new load module is compatible with underlying software frameworks on the processing units, such as middle-wares and operating systems. In some instances, a new load module may be tested in a sand box on a processing unit. Sand boxes allow a new load module to be tested against the actual processing unit environment without the risk of interfering with the operation of the actual equipment.

FIG. 2 is a flow chart illustrating load modules loaded onto a processing unit. In a typical load process, the worst case is that no checks are performed when the load modules 160 are loaded onto the processing unit 200. In other cases—such as when a package manager, like apt or yum is used—rudimentary dependency checks are performed when new packages are loaded onto a processing unit 200 or existing ones are updated. Packages that violate one or more dependencies may not be loaded.

The above build and load processes, illustrated in FIGS. 1 and 2, may function well in static environments where software changes are relatively infrequent. For example, current processes may be sufficient in a desktop setting or in a small server farm. However, in modern environments, the above build and load processes present problems. For example, in large data-centers and cloud deployments, ordinary containers or package systems are not sufficient. Additionally, since the state changes frequently in data-centers and cloud environments, frequent load module deployments are required. Furthermore, especially in a cloud environment, one must be able to package functioning software and deploy it on dynamically allocated virtual machines.

Complex applications also often stretch over several processing units 200. It is common for applications to span several processing units 200, so installation and upgrade must be coordinated across several processing units 200. For example, software may need to be loaded onto processing units 200 that perform specific tasks, and as a result, different pieces of software must work together when loaded onto the processing unit. Processing units 200 and services may also be shared between users that have different requirements. Additionally, the new software may interfere with existing software, and thereby cause errors and down-time when executed on a processing unit.

Accordingly, there exists a need to overcome the deficiencies of current software build and load processes.

SUMMARY

Particular embodiments are directed to systems, methods, and computer program products for a software build and load process using a compilation and deployment service.

In certain embodiments, software is loaded onto a server (or service) arranged to provide a compilation and deployment service. The service provides a database configured to permit storing of all of the active software employed by target processing units, for example. The active software may be in source form or an intermediate form. For example, the intermediate format may be native object code for the target environment.

In one particular embodiment, a method for a software build and load process using a compilation and deployment service is provided. The method includes receiving, at the service, new software. The method further includes comparing, at the service, the received new software with data in a database, wherein the data comprises active software. The method further includes merging, at the service, the new software and active software into one or more load modules based on the comparison. Additionally, the method further includes deploying the one or more load modules to one or more target processing units.

In certain embodiments, the new software may be source code packaged into a container. In this embodiment, the comparing step further includes checking the source code on a source level against previously defined restraints and the active software. Additionally, the merging step further includes merging and compiling the source code with the active software at the service.

In certain embodiments, the new software may be compiled source code packaged into a container with a new manifest describing the properties of the compiled source code. In this embodiment, the data in the database includes one or more existing manifest files associated with the active software. The comparing step further includes extracting the new manifest and checking the new manifest against predefined constraints and the one or more existing manifests.

In some embodiments, the new software is intermediate format source code. In this embodiment, the method comparing step further includes checking the intermediate format source code against predefined constraints and the active software. Additionally, the merging step further includes fully compiling the intermediate format source code. In some embodiments, the merging step may further include merging the intermediate format source code with the active software on a statement and expression level.

In some embodiments, the method further includes receiving, at the service, one or more code characteristics of the received new software, wherein the database data includes stored characteristics of the active software. The method further includes comparing, at the service, the received new software code characteristics with the stored active software code characteristics as part of the data comparison.

In other embodiments, the target processing units includes one or more serving GPRS support ("SGSN") nodes and load balancers, the new software comprises SGSN software and new load balancer rules, and the data comprises existing load balancer rules. In some embodiments, the method comparing step further includes checking, using one or more load balancer checks and compliers, the new load balancer rules against the existing load balancer rules. The method merging step further includes merging parts of the new load balancer rules that are common with the existing load balancer rules, and reporting the new load balancer rules that conflict with the existing load balancer rules.

In some embodiments, the method comparing step further includes checking the SGSN software at one or more SGSN checkers and compilers.

In some embodiments, the target processing units are classified by one or more of processor architecture, operating system, and/or intended use of the new software.

According to particular embodiments, a system for a software build and load process using a compilation and deployment service is provided. The system includes a compilation and deployment service including a server, a processor coupled to the server, a memory coupled to the processor, and a database coupled electronically to the server. The processor is configured to receive new software. The processor is further configured to compare the received new software with data in a database, wherein the data comprises active software. The processor is further configured to merge the new software and active software into one or more load modules based on the comparison. Additionally, the processor is further configured to deploy the load modules to target processing units.

In certain embodiments, new software is source code packaged into a container, and the processor may be further configured to check the source code on a source level against previously defined restraints and the active software. The processor may also be further configured to merge and compile the source code with the active software.

In other embodiments, the new software is compiled source code packaged into a container with a new manifest describing the properties of the compiled source code. In this embodiment, the data in the database may include one or more existing manifest files associated with the active software. Additionally, the processor may be further configured to extract the new manifest and check the new manifest against predefined constraints and one or more existing manifests.

In some embodiments, the new software is intermediate format source code and the processor is further configured to check the intermediate format source code against predefined constraints and the active software. The processor may be further configured to fully compile the intermediate format source code. In some embodiments, the processor may be further configured to merge the intermediate format source code with the active software on a statement and expression level.

In some embodiments, the system further includes a processor that is further configured to receive one or more code characteristics of the received new software, wherein the database data includes stored characteristics of the active software. The processor may be further configured to compare the received new software code characteristics with the stored active software code characteristics as part of the data comparison.

In other embodiments, the target processing units include one or more SGSN-nodes and load balancers, the new software includes SGSN software and new load balancer rules, and the data includes existing load balancer rules. In some embodiments, the system may include a processor further configured to check the new load balancer rules against the existing load balancer rules. The processor may be further configured to merge parts of the new load balancer rules that are common with the existing load balancer rules. The processor may also be further configured to report the new load balancer rules that conflict with the existing load balancer rules. In some embodiments, the system may further include one or more SGSN checkers and compilers, wherein the processor is further configured to check the new SGSN software using the one or more SGSN checkers and compilers.

According to another embodiment, a non-transitory computer program product comprising a computer readable medium storing computer readable program code embodied in the medium is provided. The computer program product includes program code for causing a device to receive new software. The computer program product includes program code for causing a device to compare the received new software with data in a database, wherein the data contains active software. The computer program product includes program code for causing a device to merge the new software and active software into one or more load modules based on the comparison. Additionally, the computer program product includes program code for causing a device to deploy the load modules to one or more target processing units.

In certain embodiments, the new software is source code packaged into a container. The computer program product further includes program code for causing the device to check the source code on a source level against previously defined restraints and the active software. The computer program product further includes program code for causing the device to merge and compile the source code with the active software.

In other embodiments, the new software is compiled source code packaged into a container with a new manifest describing the properties of the compiled source code. Additionally, the data in the database includes one or more existing manifest files associated with the active software. The computer program product further includes program code for causing the device to extract the new manifest and check the new manifest against predefined constraints and the one or more existing manifests.

In some embodiments, the new software is intermediate format source code. The computer program product may further include program code for causing the device to check the intermediate format source code against predefined constraints and the active software. The computer program product may further include program code for causing the device to merge the intermediate format source code with the active software on a statement and expression level.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Particular embodiments are directed to systems, methods, and computer program products for a software build and load process using a compilation and deployment service.

New software may be loaded onto a service that manages the creation and deployment of load modules. The service may act as an intermediary that deploys new software load modules to processing units. In some embodiments, the service is a server that contains a database. The database may contain all of the active software that is currently executed on target processing units, software that was previously received by the service and deployed to target processing units, and/or other information, such as constraints, about target processing units. The active software may be stored in several different formats, including, for example, source form or an intermediate format. In some embodiments, the intermediate format may be native object code for the target processing unit environment.

In some embodiments, the service may receive new software either in source form or in some pre-compiled intermediate code. In an exemplary embodiment, the intermediate code allows the service to inspect and check the code for compliance with target processing units. Once checked for compliance, the service can merge the new software with the software previously uploaded to the service and stored in the database. In some embodiments, new load units can be generated from the merged software and deployed to target processing units.

Figure 1:
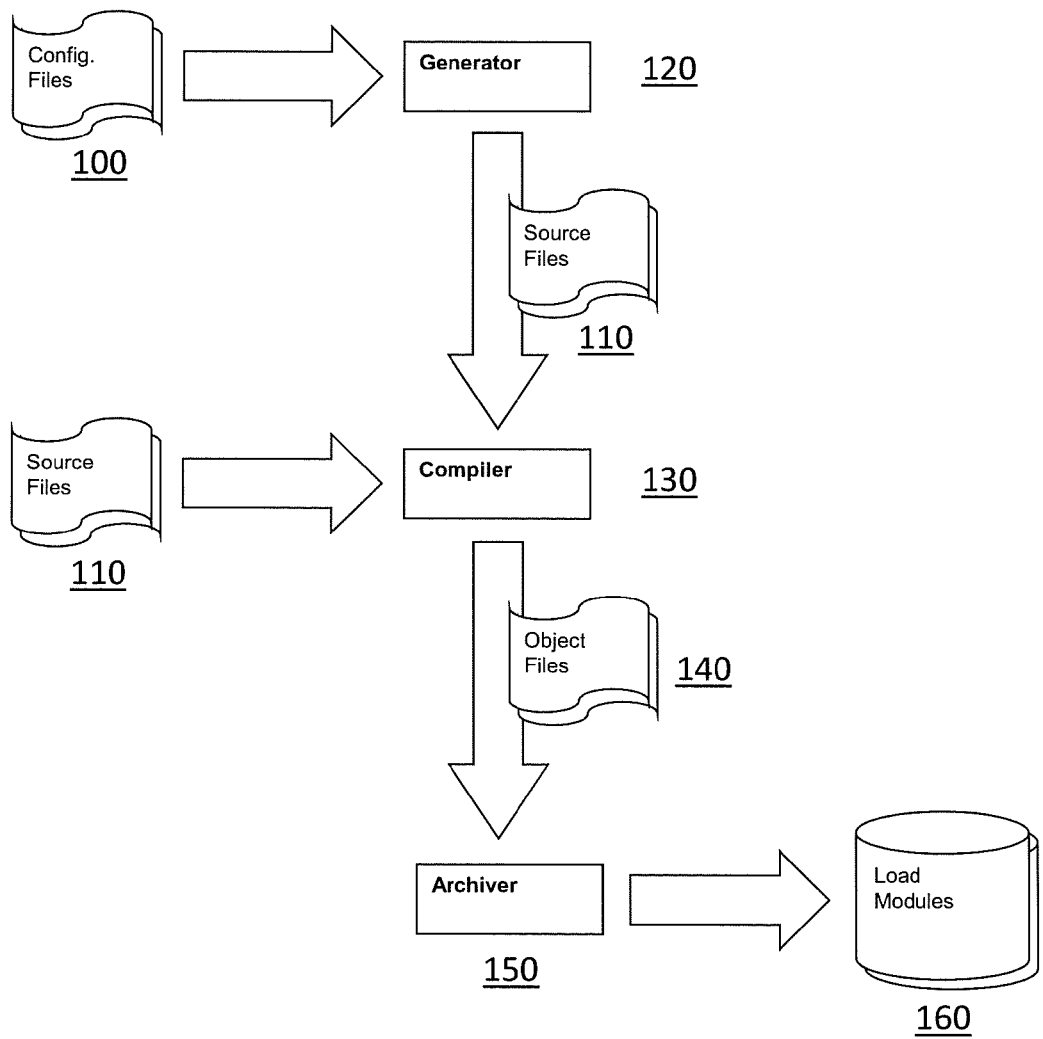
FIG. 1 is a flow chart illustrating a typical build process.
Figure 2:
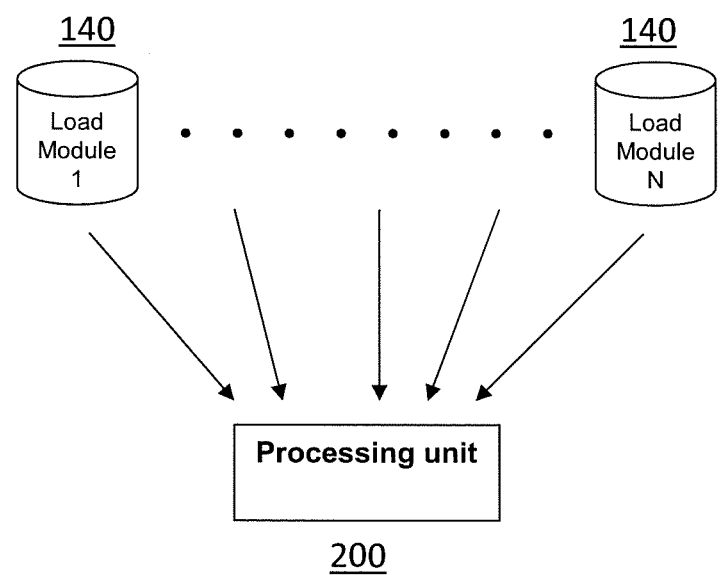
FIG. 2 is a flow chart illustrating load modules loaded onto a processing unit.
Figure 3:
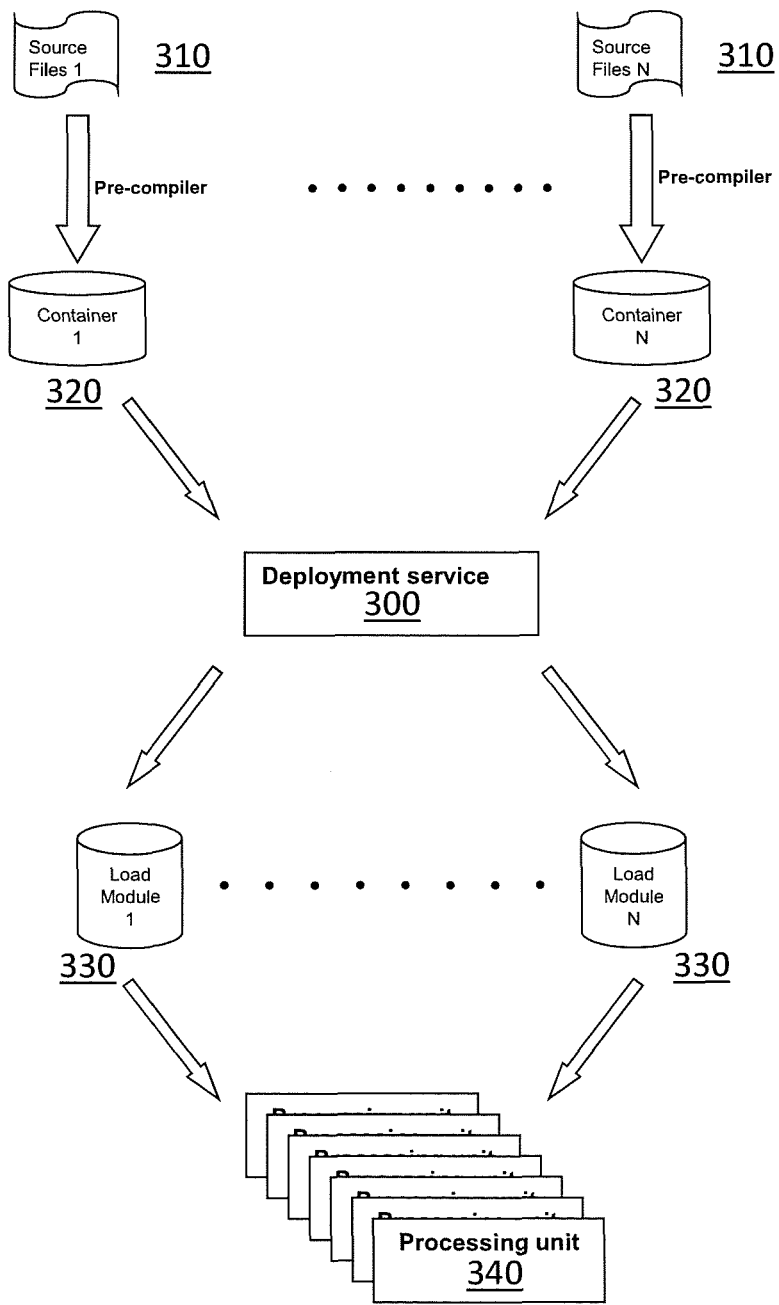
FIG. 3 is a flow chart illustrating deployment using a deployment service in accordance with exemplary embodiments.

Referring now to FIG. 3, a flow chart illustrating deployment using a deployment service according to exemplary embodiments is shown. In an exemplary embodiment, the service 300 receives new software to be deployed on a processing unit 340. In some embodiments, the new software, which may be source files and/or intermediate code 310, may be packaged by a pre-compiler into one or more containers 320. The service 300 may receive one or more containers 320. In exemplary embodiments, any uploaded container 320 contains code 310 in a form suitable for the deployment service 300 to inspect and check the code inside the container 320 for compliance with the active software and target processing unit information, which may be stored in a database.

In an exemplary embodiment, the service 300 ensures that the received new software works together with the active, or existing, software. One advantage is that it is possible to ensure that the new software works with the active software before it is deployed to processing units 340. Another advantage is that it is possible to check software from different suppliers for compatibility with existing software on processing units 340 without having to disclose the source code.

There are several possibilities when creating the new intermediate code and checking the intermediate code with the active software. In one embodiment, for example, the source code 310 may be packaged into a container 320 before being received by the service 300. The service 300 may check or compare the source code against predefined constraints and/or the active code in the database. If all of the constraints are met, the new code may be compiled and merged with the other active software into load modules 330. The compiled form may include, for example, native object code or an intermediate virtual machine code, such as for a Java™ Virtual Machine ("JVM").

In some embodiments, the source code 310 may be compiled and packaged into a container 320, and a manifest describing the code in the container may be transmitted with the container 320. Generally, characteristics about code, including source and intermediate code, may be received by the service 300. The service 300 may receive the code inside the container 320 and the manifest describing the properties of the code (i.e., code characteristics) inside the container. In some embodiments, when the service 300 receives the code inside the container 320, the service 300 extracts and checks the manifest describing the code against predefined constraints (i.e., code characteristics) as well as the other manifests of the active, or previously uploaded, code stored in the database. If all of the constraints are met, the service 300 may merge the compiled new software, or the code inside the container 320, with the other active software stored in the database to form one or more load modules 330.

In certain embodiments, the source code 310 may be compiled into an intermediate format which is not human-readable but can be inspected programmatically. The semi-compiled code 310 may be packaged inside a container 320 and be received by the service 300. The service 300 may check the semi-compiled code against predefined constraints (i.e., code characteristics) as well as the active code stored in the database for compatibility. If all of the constraints are met, the code may be compiled to its final form and merged with the other active software into load modules 330. The compiled form may include, for example, native object code or an intermediate virtual machine code, such as for a Java™ Virtual Machine ("JVM").

One advantage of the above embodiments and others is that the new software 310, 320 is not required to be uploaded in source form and therefore cannot be easily inspected by humans. However, the new software is available in all of its complexity to a consistency checker implemented on service 300. For example, the new software may be checked by the service's consistency checker down to the statement and expression level for any possible inconsistencies or constraints. Another advantage may be that it is possible to intricately merge semi-compiled code with the other, active, code down to the statement and expression level. Therefore, it may be possible for service 300 to receive parts of an application and to merge it completely with the whole application once checked for compatibility and other constraints. Furthermore, it is possible that the service 300 may merge software parts from different suppliers into one application.

In some embodiments, the database contains classifications of target processing units 340 including, for example, processor architecture, operating system, etc. The database may also contain classification information concerning the intended use of a processing unit 340 or active software, so that a processing unit 340 may only receive new software that is intended for that processing unit. These classifications and the classification information can be included as part of the code characteristics associated with the new software or the active software.

Furthermore, in some embodiments, the service 300 may deploy the load modules 330 to processing units 340. Once the building process starts, service 300 may generate or rebuild load modules 330 for target processing units 340 that are affected by the new software change. The service 300, after rebuilding or building the load modules 330, loads and activates the load modules 330 onto target processing units 340.

Figure 4:
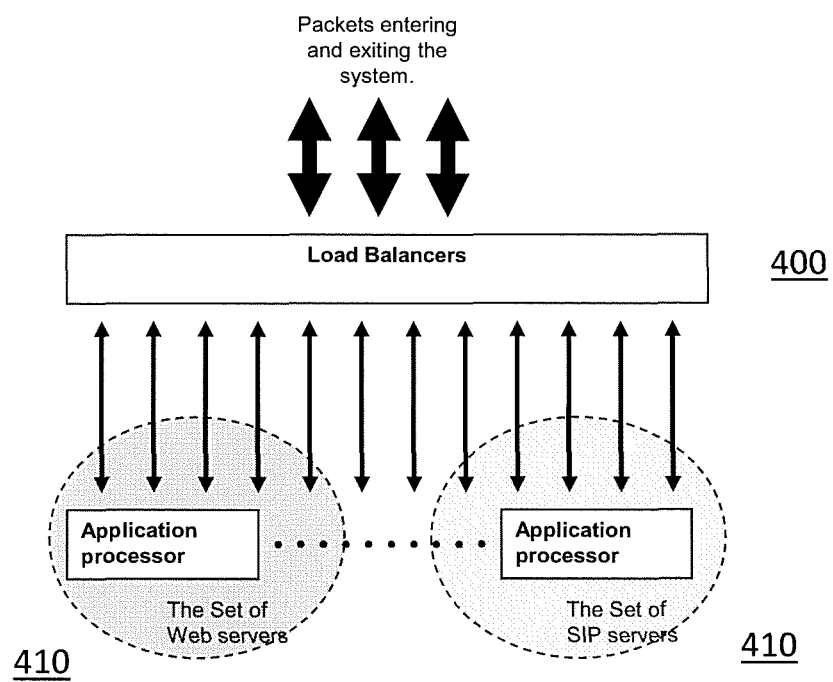
FIG. 4 is a flow chart illustrating load balancers serving application processors in accordance with exemplary embodiments.

Referring now to FIG. 4, a flow chart illustrating load balancers serving application processors, according to some embodiments, is shown. In some embodiments, some of the processing units act as load balancers 400 for some other processing units running applications 410. The applications may include any application that accepts packets from a network, including, for example, web-servers, sip-servers, Mobility Management Entity ("MME") nodes, home subscriber sever ("HSS") nodes, etc.

The configuration of the application processors 410 are dynamic and may change over time. In some embodiments, when the configuration is changed, the software of the load-balancers 400 is updated in order to accommodate new and/or updated applications. In some embodiments, and according to the setup in FIG. 4, the system may be currently running both Web and SIP servers on processing units 410. It may be desirable, for example, to reconfigure some of the processing units 410 to run as a SGSN-node. Consequently, SGSN software would need to be installed on some of the processing units 410. Additionally, the software on the load-balancers 400 may need to be upgraded so that the load-balancers 400 may distribute connections from the radio network to specific application processors that handle them.

Figure 5:
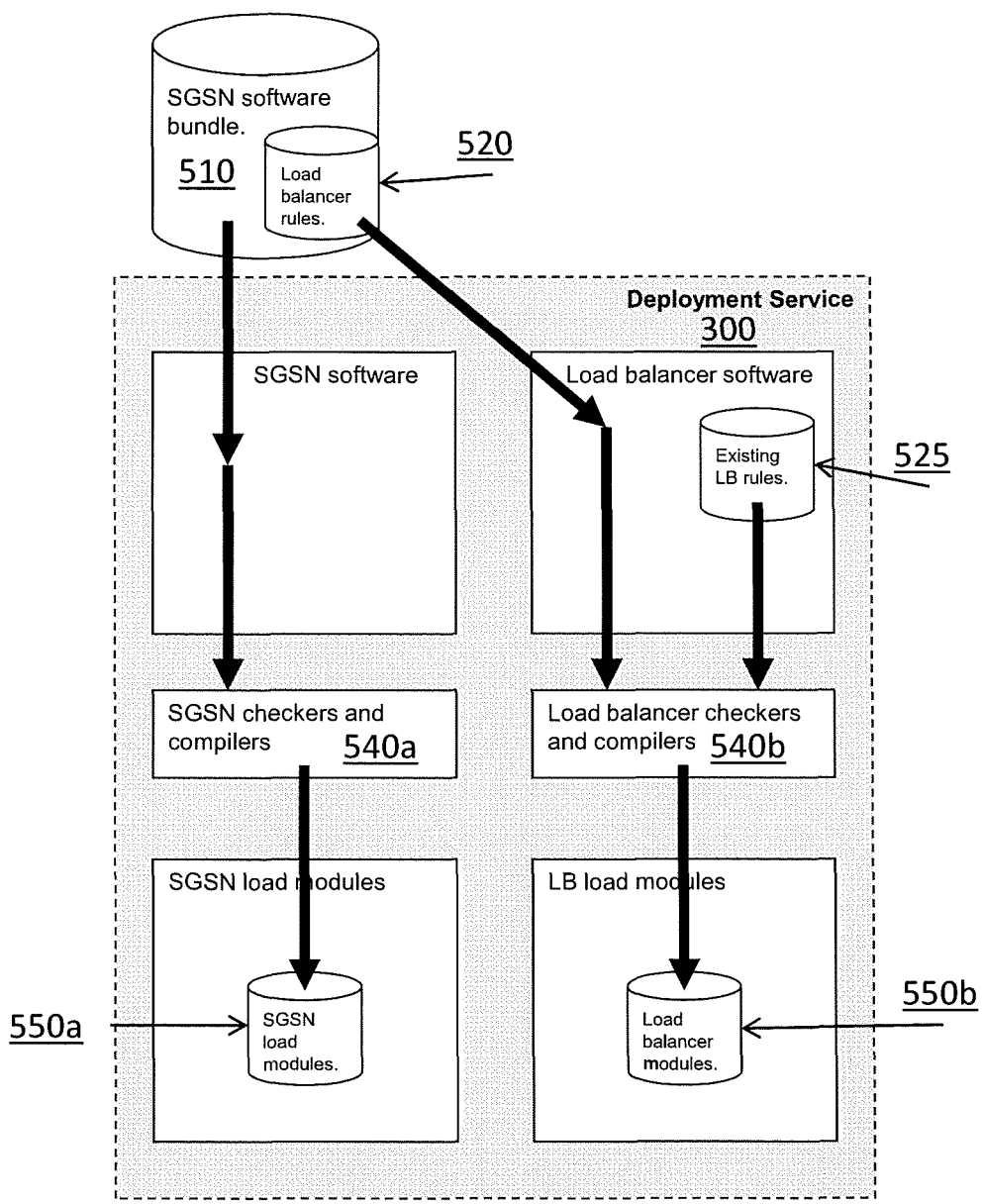
FIG. 5 is flow chart illustrating checking and final stage of building of the new SGSN related software in accordance with exemplary embodiments.

FIG. 5 is flow chart illustrating checking and final stage of building of the new SGSN related software according to exemplary embodiments. As described in the example above, it may be desirable to reconfigure certain processing units to run an SGSN-node in a system with only web servers and SIP servers. According to some embodiments, service 300 may receive a new SGSN software bundle 510, or new software, and load balancer rules 520 associated with the new SGSN software bundle 510.

In some embodiments, the service 300 may run the new SGSN software bundle 510 through an SGSN checker and compiler 540a. In some embodiments, the SGSN checker and compiler 540a may compare the new SGSN software with, for example, active SGSN software or processing unit constraints stored in a database accessible by server 300. If the SGSN software bundle 510 successfully completes the comparisons performed by the SGSN checker 540a, then the new SGSN software bundle 510 may be compiled into code that can be understood by one or more processing units and loaded into SGSN load modules 550a.

In some embodiments, the load-balancer rules 520 are pre-compiled into a format which is not human readable but can be parsed by the next stage of the rule compiler on service 300. In exemplary embodiments, the new load-balancer rules 520 are checked against the existing load-balancer rules 525. The existing load-balancer rules 525 may, for example, be stored in a database accessible by service 300. In some embodiments, there is a load-balancer checker and compiler 540b that compares and compiles the new load balancer rules 520. The comparison performed by the load balancer checker and compiler 540 may include determining which parts of the new load-balancer rules 520 and existing load-balancer rules 525 are common. The comparison may also include determining and reporting conflicting parts of the new load-balancer rules 520 and existing load-balancer rules 520. These load balancer rules can be included as part of the code characteristics associated with the new software or the active software.

In some embodiments, the load-balancer checker and compiler 540 may merge all of the new load balancer rules 520 with the existing load balancer rules 525, or it may only merge a subset of the rules, such as the common rules. Additionally, the merged rules may be compiled into code that can be understood by the load-balancers and are packaged into load modules 550b. In some embodiments, should an error occur—for instance if some new load balancer rules 520 will conflict with existing load balancer rules 525—the old software version will not be removed from the target processing units. Furthermore, an error report may be sent back to the user that initiated the transaction.

Figure 6:
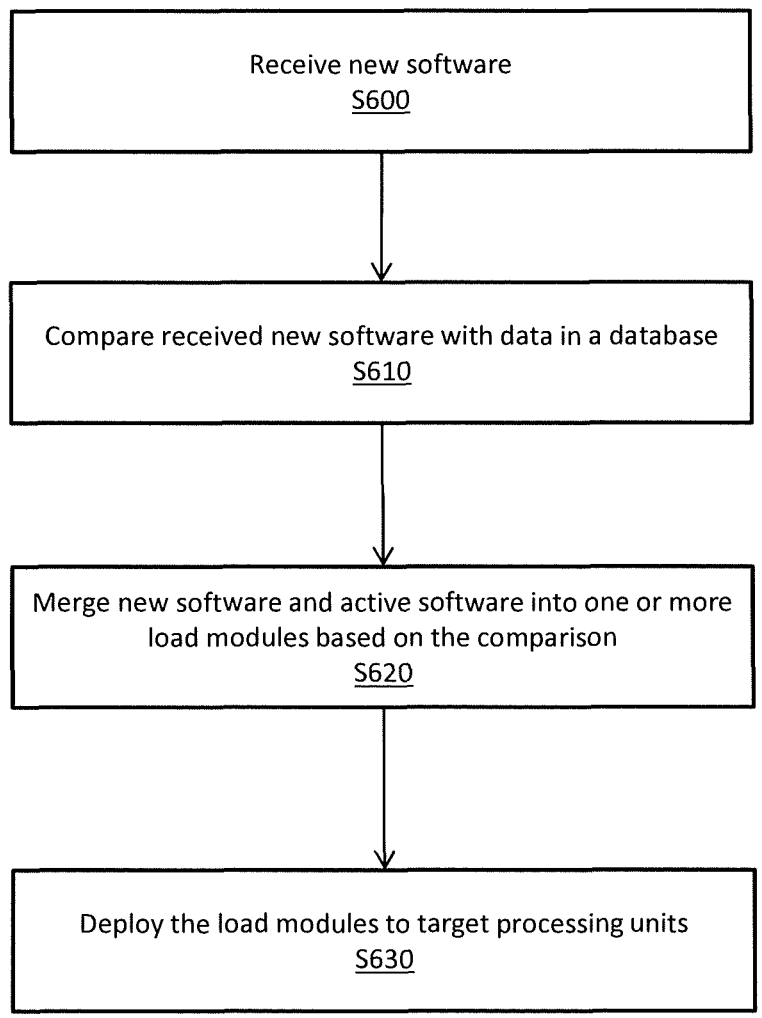
FIG. 6 is a flow chart illustrating a method of deployment using a deployment service, in accordance with exemplary embodiments.

Referring now to FIG. 6, a flow chart illustrating a method of deployment using a deployment service, according to exemplary embodiments, is shown. In some embodiments, according to step S600, the service receives new or modified software. As explained above, the received software may be in many different formats, including source code form, an intermediate form, a compiled form with a manifest describing the code, etc.

In some embodiments, in accordance with step S610, the service compares the received new software with data in a database. The data may include, for example, active software that is currently deployed on target processing units, software that has been previously received at the service, constraints about the software and/or target processing units, code characteristics about the software and/or target processing units, etc. The comparison may include, for example, checking for inconsistencies between the received new software and the active software, checking for compatibility, e.g., operating system requirements, in addition to evaluating other constraints and code characteristics.

In accordance with step S620, in some embodiments the service merges the new software and active software into one or more load modules based on the comparison of step S610. As explained above, the new software may be in source code form or an intermediate form and may additionally need to be compiled in order to be merged with the active software into load modules. Furthermore, based on the comparison, the new software in its entirety or a subset, such as only the components that are common between the new and active software, may be merged with the active software and built into load modules.

In some embodiments, in accordance with step S630, the one or more load modules may be deployed to one or more target processing units. The deployment may be based, for example, on data contained in the database about the processing units.

Figure 7:
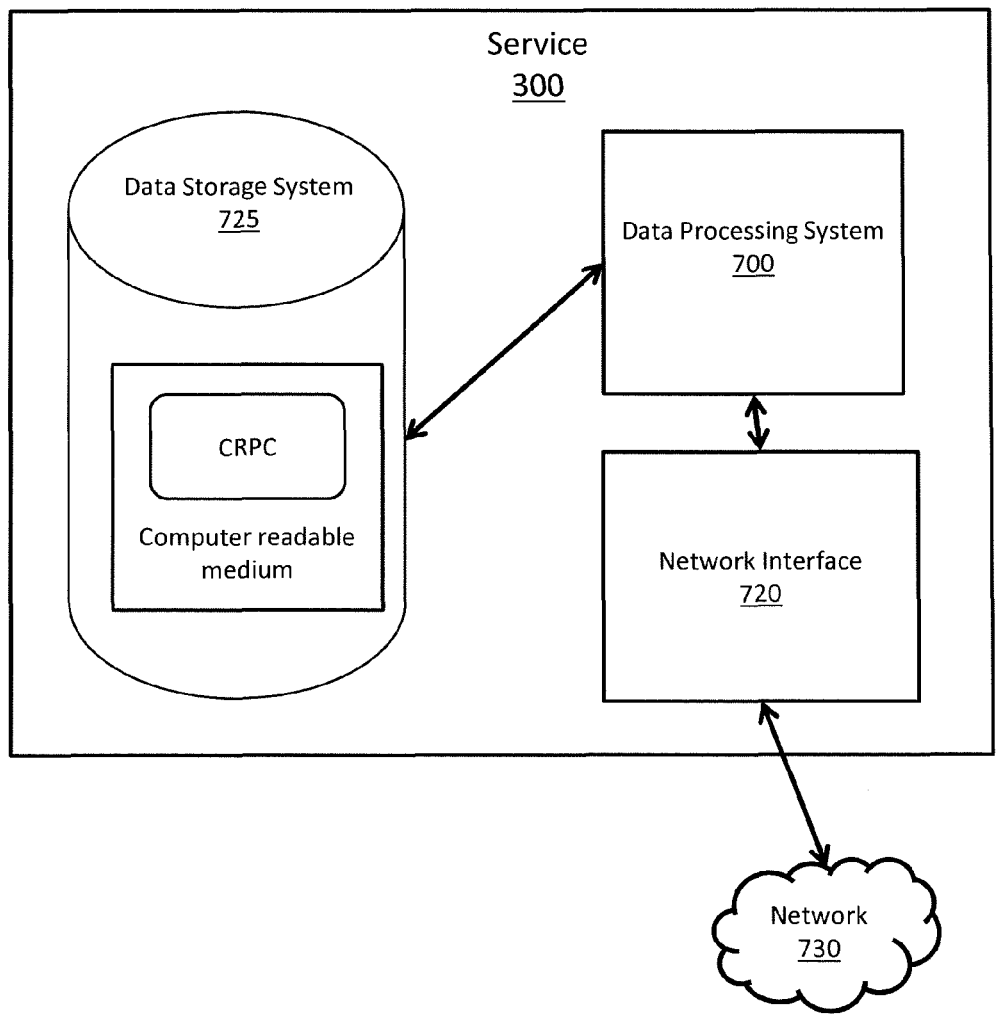
FIG. 7 is a functional block diagram that schematically illustrates a service, in accordance with exemplary embodiments.

Now referring to FIG. 7, a functional block diagram that schematically illustrates a service, according to exemplary embodiments, is shown. The service 300 may include a processor or other processing means, a memory or other storage means and a network interface or other networking means. In an exemplary embodiment, the device includes a data processing system 700 (e.g., one or more of the following: microprocessors, application specific integrated circuits—ASICs, Field-programmable gate arrays (FPGAs), logic circuits, and other circuits), a data storage system 725 (e.g., non-volatile memory such as hard disk, flash memory or other storage unit), and a network interface 720.

Data storage system 725 may include one or more non-volatile storage devices and/or one or more volatile storage device (e.g., random access memory (RAM)). In instances where service 300 includes data processing system 700 and a microprocessor, computer readable program code may be stored in a computer readable medium, such as, but not limited to, magnetic media (e.g. a hard disk), optical media (e.g., a DVD), memory devices (e.g., random access memory), etc. In some embodiments, computer readable program code is configured such that when executed by a processor, the code causes the device to perform the steps described above. In other embodiments, the device is configured to perform steps described above without the need for code.

Furthermore, network interface 720 may provide means to connect to network 730. The network interface 720 is configured to enable communication with a communication network 730, using a wired and/or wireless connection. In an exemplary embodiment, processing units are also connected to network 730. Network 730 may be, for example, a GPRS core network, the Internet, etc.

In embodiments where the service is a server, the server 300 may include a network interface 720 for transmitting and receiving data, a data processing system 700 with a processor for controlling operation of the server device 300, and a data storage system 725 for storing computer readable instructions (i.e., software) and data. The network interface 720 and data storage system 725 are coupled to and communicate with the data processing system 700, which controls their operation and the flow of data between them.

The methods described herein can be implemented in the service 300 described above. In such embodiments, the method actions are realized by means of computer readable program code that is stored in the computer readable medium of data storage system 725 and is executable by the data processing system 700. Such computer readable program code can be realized and provided in any suitable way, e.g. installed during manufacturing, uploaded at a later time, etc., as the skilled person will appreciate. Moreover, the data storage system 725, the data processing system 700, as well as the network interface 720 comprise software and/or firmware that, in addition to being configured such that it is capable of implementing the methods to be described, is configured to control the general operation of the service when operating in a network. However, for the purpose of avoiding unnecessary detail, no further description will be made in the present disclosure regarding this general operation.

The above described embodiments pose several advantages. For example, by using a service to automate the resolution of complex dependencies between software packages, the number or errors are reduced when software is deployed in complex data-center and/or cloud environments. Additionally, the use of a service may simplify software management and deployment by automating the deployment of new software by a common set of rules automatically mapping the new software onto specific processing units.

Furthermore, the use of a service may introduce new possibilities in software integration. For example, new software can be checked against a set of constraints that ensure that the software is applicable for the intended system and that the intended operating environment is compatible with the software. Additionally, the use of a service may allow intricate merging of software, thereby creating a synthesis of the existing software and the new version.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for a software build and load process using a compilation and deployment service comprising:
   receiving, at said service, new software;
   comparing, at said service, said received new software with data in a database, wherein the data comprises active software and previously defined constraints about one or more target processing units;
   merging, at said service said new software and active software into one or more load modules based on said comparison; and
   deploying said one or more load modules to said one or more target processing units,
   wherein said new software comprises source code packaged into a container,
   wherein said comparing step further comprises checking said source code on a source level against said previously defined constraints and said active software, and
   wherein said merging step further comprises merging and compiling said source code with said active software at said service.

2. The method of claim 1, wherein
   said new software further comprises compiled source code packaged into a container with a new manifest describing the properties of said compiled source code, said data in said database comprises one or more existing manifest files associated with said active software; and, said comparing step further comprises extracting said new manifest and checking said new manifest against said previously defined constraints and said one or more existing manifests.

3. The method of claim 1, wherein said new software further comprises intermediate format source code, wherein said comparing step further comprises checking said intermediate format source code against said previously defined constraints and said active software, and said merging step further comprises fully compiling said intermediate format source code.

4. The method of claim 3, wherein said merging step further comprises merging said intermediate format source code with said active software on a statement and expression level.

5. The method of claim 1, further comprising:

receiving, at said service, one or more code characteristics of said received new software, wherein said database data includes stored characteristics of said active software; and, comparing, at said service the received new software code characteristics with said stored active software code characteristics as part of said data comparison.

6. The method of claim 1, wherein said target processing units comprise one or more serving GPRS support nodes ("SGSN") and load balancers, said new software comprises SGSN software and new load balancer rules, and said previously defined constraints comprise existing load balancer rules.

7. The method of claim 6, wherein said comparing step further comprises checking, using one or more load balancer checkers and compliers, said new load balancer rules against said existing load balancer rules, wherein said merging step further comprises merging parts of said new load balancer rules that are common with said existing load balancer rules and reporting said new load balancer rules that conflict with said existing load balancer rules.

8. The method of claim 6, wherein said comparing step further comprises checking, at one or more SGSN checkers and compliers, said SGSN software.

9. The method of claim 1, wherein said target processing units are classified by one or more of processor architecture, operating system, and/or intended use of said new software.

10. A system for a software build and load process using a compilation and deployment service comprising:

a server;
a processor coupled to said server;
a memory coupled to said processor; and,
a database coupled electronically to said server;
wherein the processor is configured to:
 receive new software;
 compare said received new software with data in a database, wherein the data comprises active software and previously defined constraints about one or more target processing units;
 merge said new software and active software into one or more load modules based on said comparison; and
 deploy said one or more load modules to said one or more target processing units,
wherein said new software comprises source code packaged into a container,
wherein said processor is further configured to:
 check said source code on a source level against said previously defined constraints and said active software, and
 merge and compile said source code with said active software.

11. The system of claim 10, wherein said new software further comprises compiled source code packaged into a container with a new manifest describing the properties of said compiled source code and said dada in said databases comprises one or more existing manifest files associated with said active software, wherein said processor is further configured to:

extract said new manifest and check said new manifest against said previously defined constraints and said one or more existing manifests.

12. The system of claim 10, wherein said new software further comprises intermediate format source code, wherein said processor is further configured to:

check said intermediate format source code against said previously defined constraints and said active software, and fully compile said intermediate format source code.

13. The system of claim 12, wherein said processor is further configured to merge said intermediate format source code with said active software on a statement and expression level.

14. The system of claim 10, wherein said processor is further configured to:

receive one or more code characteristics of said received new software, wherein said database data includes stored characteristics of said active software, and compare the received new software code characteristics with said stored active software code characteristics as part of said data comparison.

15. The system of claim 10, wherein said target processing units comprise one or more serving GPRS support nodes ("SGSN") and load balancers, said new software comprises SGSN software and new load balancer rules, and said previously defined constraints comprise existing load balancer rules.

16. The system of claim 15 further comprising one or more load balancer checkers and compliers, wherein said processor is further configured to:

check said new load balancer rules against said existing load balancer rules;

merge parts of said new load balancer rules that are common with said existing load balancer rules; and, report said new load balancer rules that conflict with said existing load balancer rules.

17. The system of claim 15, further comprising one or more SGSN checkers and compliers, wherein said processor is further configured to:

check said new SGSN software using the one or more SGSN checkers and compilers.

18. The system of claim 10, wherein said target processing units are classified by one or more of processor architecture, operating system, and/or intended use of said new software.

19. A non-transitory computer program product comprising a computer readable medium storing computer readable program code embodied in the medium, the computer program product comprising:

program code for causing a device to receive new software;

program code for causing said device to compare said received new software with data in a database, wherein the data comprises active software and previously defined constraints about one or more target processing units;

program code for causing said device to merge said new software and said active software into one or more load modules based on said comparison; and program code for causing said device to deploy said load modules to said one or more target processing units, wherein said new software comprises source code packaged into a container, wherein said computer program product further comprises:

program code for causing said device to check the source code on a source level against said previously defined constraints and said active software, and program code for causing said device to merge and compile said source code with said active software.

20. The non-transitory computer program product of claim 19, wherein said new software further comprises compiled source code packaged into a container with a new manifest describing the properties of said compiled source code, said data in said database comprises one or more existing manifest files associated with said active software, and said computer program product further comprises:

program code for causing said device to extract said new manifest and check said new manifest against said previously defined constraints and said one or more existing manifests.

21. The non-transitory computer program product of claim 19, wherein said new software further comprises intermediate format source code and said computer program product further comprises:

program code for causing said device to check said intermediate format source code against said previously defined constraints and said active software; and program code for causing said device to merge said intermediate format source code with said active software on a statement and expression level.

* * * * *

UNITED STATES PATENT AND TRADEMARK OFFICE
CERTIFICATE OF CORRECTION

PATENT NO. : 9,189,227 B2
APPLICATION NO. : 14/105694
DATED : November 17, 2015
INVENTOR(S) : Johansson et al.

Page 1 of 1

It is certified that error appears in the above-identified patent and that said Letters Patent is hereby corrected as shown below:

In the specification

In Column 3, Line 45, delete "compliers," and insert -- compilers, --, therefor.

In the claims

In Column 11, Line 34, in Claim 7, delete "compliers," and insert -- compilers, --, therefor.

In Column 11, Line 42, in Claim 8, delete "compliers," and insert -- compilers, --, therefor.

In Column 12, Line 6, in Claim 11, delete "said dada" and insert -- said data --, therefor.

In Column 12, Line 39, in Claim 16, delete "compliers," and insert -- compilers, --, therefor.

In Column 12, Line 48, in Claim 17, delete "compliers," and insert -- compilers, --, therefor.

Signed and Sealed this
Tenth Day of May, 2016

Michelle K. Lee
*Director of the United States Patent and Trademark Office*